United States Patent [19]

Palermo et al.

[11] Patent Number: 5,248,562
[45] Date of Patent: Sep. 28, 1993

[54] POLYVINYL CHLORIDE PLASTISOL COMPOSITION SUITABLE AS A SEALANT

[75] Inventors: Anthony C. Palermo, Gibsonia; Karl F. Schimmel, Verona, both of Pa.; Michael M. Chau, San Diego, Calif.

[73] Assignee: PPG Industries, Inc., Pittsburgh, Pa.

[21] Appl. No.: 815,600

[22] Filed: Dec. 27, 1991

Related U.S. Application Data

[63] Continuation of Ser. No. 476,225, Feb. 7, 1990, abandoned.

[51] Int. Cl.$^5$ .................. B32B 15/08; B32B 27/28
[52] U.S. Cl. .................... 428/522; 428/521; 428/463; 525/207; 524/517; 524/527; 427/388.5; 427/409
[58] Field of Search ............ 525/207; 427/388.5, 427/409; 524/517, 527; 428/522, 521

[56] References Cited

U.S. PATENT DOCUMENTS

| | | | |
|---|---|---|---|
| 3,632,839 | 1/1972 | Young et al. | 525/207 |
| 3,640,973 | 2/1972 | Chambers et al. | 525/207 |
| 3,720,734 | 3/1973 | Kopacki et al. | 525/207 |
| 3,725,508 | 4/1973 | Stamm | 525/207 |
| 3,755,219 | 8/1973 | Bergomi et al. | 525/207 |
| 4,020,966 | 5/1977 | Wszolek | 215/349 |
| 4,871,801 | 10/1989 | Sharaby | 525/207 |
| 4,882,376 | 11/1989 | Drisscoll et al. | 524/157 |
| 5,035,925 | 7/1991 | Schimmel et al. | 525/207 |

FOREIGN PATENT DOCUMENTS

| | | |
|---|---|---|
| 674300 | 11/1963 | Canada . |
| 50-55648 | 5/1975 | Japan . |
| 50-149777 | 12/1975 | Japan . |
| 53-96086 | 8/1978 | Japan . |
| 62-064851 | 3/1987 | Japan . |

*Primary Examiner*—Carman J. Seccuro, Jr.
*Attorney, Agent, or Firm*—William J. Uhl

[57] ABSTRACT

A plastisol based composition contains:
(a) a copolymer of an aliphatic olefinically unsaturated material and an anhydride containing material; and
(b) a polyvinyl chloride plastisol.

The composition is particularly suitable for use as a sealant.

8 Claims, No Drawings ate, diisodecyl phthalate, diisononyl phthalate, trimethyl pentanediol isobutyrate, sucrose benzoate, butyl cyclohexyl phthalate, butyl octyl phthalate, isooctyl
POLYVINYL CHLORIDE PLASTISOL COMPOSITION SUITABLE AS A SEALANT This application is a continuation of application Ser. No. 07/476,225, filed Feb. 7, 1990, now abandoned.

BACKGROUND OF THE INVENTION

The present invention relates to polyvinyl chloride plastisol compositions, for example sealant compositions.

In the manufacture of automobiles, the automobile body is initially primed with a coating composition to prevent corrosion of the metal. This can be done in a number of ways although generally it is performed by cationic electrodeposition using the auto body as the cathode. Once the automobile body has been primed in this manner, subsequent steps in the assembly are carried out. These steps typically include the use of sealants over the primed automobile body. The sealants are subsequently topcoated along with the remainder of the body during the final stages of the painting process.

Polyvinyl chloride plastisols offer several advantages for use as sealant compositions: a good balance of strength, elongation and toughness, minimal to no volatile organic component and low cost. However, despite these advantageous properties, when used in conjunction with cationically electrodepositable primer compositions in automotive applications, adhesion is poor and yellowing of the topcoat composition results.

Historically, polyaminoamides which are art recognized adhesion promoters, have been utilized in an attempt to deal with the above adhesion problems. These, however, can adversely affect the stability of the plastisol based sealant composition, the cure of the topcoat and in addition, cause more yellowing.

There is a need, therefore, for a polyvinyl chloride plastisol based composition which exhibits excellent adhesion to primed metal and is capable of being topcoated with a variety of coating compositions without yellowing of the topcoat.

SUMMARY OF THE INVENTION

In accordance with the present invention, there is provided a plastisol based composition comprising:
(a) a copolymer of an aliphatic olefinically unsaturated material and an anhydride containing material; and
(b) a polyvinyl chloride plastisol.

DETAILED DESCRIPTION OF THE INVENTION

The composition of the present invention comprises as one of its principal components a polyvinyl chloride plastisol. A plastisol is a dispersion of powdered polyvinyl chloride resin in a liquid plasticizer to produce a fluid matrix which may range in viscosity from pourable liquid to a heavy paste. The polyvinyl chloride homopolymers or copolymers are typically produced by emulsion polymerization. Once the polymer is produced and dried, it is dispersed in plasticizer. The choice of plasticizer depends upon many factors including the desired solids viscosity relationship, processing characteristics and the ultimate desired performance properties. Suitable plasticizers include didecyl phthalate, diisodecyl phthalate, diisononyl phthalate, trimethyl pentanediol isobutyrate, sucrose benzoate, butyl cyclohexyl phthalate, butyl octyl phthalate, isooctyl epoxystearate, dipropylene glycol dibenzoate, di-2-ethylhexyl adipate, diisodecyl adipate, diisodecyl gluterate, dioctyl sebacate and mixtures thereof. Also suitable for use alone or in admixture with the monopolymeric plasticizers are polymeric plasticizers including polymeric benzoates, polymeric adipates, polymeric glutarates, polymeric sebacates, polymeric phthalates and mixtures thereof.

It should be understood that polyvinyl chloride homopolymers or copolymers can be prepared either as functional or non-functional polymers. By functional polyvinyl chloride is meant a homopolymer or copolymer (usually with vinyl acetate) of polyvinyl chloride in which a small amount of comonomer is added which contributes, hydroxyl, carboxyl, anhydride or other side groups to the chain. Examples include carboxyl functional polyvinyl chlorides such as Union Carbide's VMCA and hydroxyl functional polyvinyl chlorides such as Union Carbide's VROH. By non-functional is meant the homopolymer or copolymer without such modification.

In one embodiment of the present invention the polyvinyl chloride plastisol is prepared from a mixture of functional and non-functional polyvinyl chloride polymer.

Although a brief description of the preparation of vinyl chloride plastisols has been given above, it should be understood that the preparation of these materials is well appreciated by those skilled in the art and further details are not required for practice of the present invention. If further details are desired, the following references provide a detailed description of the preparation of vinyl chloride plastisols which are suitable for use in the present invention: *Plastisols and Organosols*, edited by Harold A. Sarvetnick, published by Van Nostrand Reinhold, 1972 and "PVC: Formulation, Compounds and Processing, A Review and Update", reprint of the Society of Plastic Engineers, 1981.

The second principle component of the claimed curable compositions is a copolymer of an aliphatic olefinically unsaturated material and an anhydride containing material.

The aliphatic olefinically unsaturated material can be a linear aliphatic material such as a diene. Suitable dienes include 1,3-dienes containing from 4 to 12 and preferably from 4 to 6 carbon atoms. Typical dienes include 1,3-butadiene, 2,3-dimethyl-1,3-butadiene, isoprene, chloroprene, and piperylene. Other polymerizable monomers such as methyl methacrylate, acrylic acid and styrene can be copolymerized with the dienes.

The aliphatic olefinically unsaturated material can also be a normal alpha olefin such as 1-decene, 1-hexene, 1-octene or tetradecene.

The aliphatic olefinically unsaturated material can also be cyclic or alicyclic such as pinene or indene. Preferably the normal alpha olefin 1-decene is utilized.

The anhydride containing material can be selected from a variety of materials which are capable of vinyl addition polymerization. Suitable anhydrides include maleic anhydride, itaconic anhydride, citraconic anhydride, dodecenyl succinic anhydride and nadic anhydride. Preferably, the anhydride containing material is maleic anhydride.

It should be understood that the scope of the anhydride containing material is also intended to include simple adducts of an anhydride, such as those mentioned above, with another suitable material capable of forming an adduct, such as rosin, the anhydride adduct being copolymerizable with the aliphatic olefinically unsaturated material.

Generally, the copolymer of the present invention has a number average molecular weight ranging from about 500 to about 50,000, usually about 1000 to about 10,000 and preferably about 1000 to about 5000 as determined by gel permeation chromatography (GPC) using a polystyrene standard.

It should be understood that in some embodiments, the copolymer can be commercially obtained. For example, Colorado Specialty Chemicals provides RICON 131/MA-17 which is a copolymer of polybutadiene and maleic anhydride.

The copolymer can be prepared by methods well known to those skilled in the art. Briefly, excess olefinically unsaturated material and anhydride are free radically polymerized at 120° C. to 180° C. in the presence of peroxide initiator to produce a 1/1 copolymer. Residual olefinically unsaturated material is stripped and the copolymer supplied in flake form or dissolved in a suitable plasticizer. Additionally, the anhydride can be added at temperatures exceeding 130° C. to preformed polymers containing olefinic unsaturation to yield copolymers which are also useful.

The copolymer is typically present in the claimed composition in an amount ranging from about 0.5 to about 20, preferably from about 1 to about 5, the percentages based on the total weight of the composition.

The polyvinyl chloride plastisol is typically present in the claimed composition in an amount ranging from about 15 percent to about 50 percent, preferably from about 20 percent the about 40 percent, the percentages based on the total weight of the composition.

The compositions of the claimed invention can also contain other resinous ingredients so long as they do not detract from the properties of the final composition. Examples of such resinous additives include copolymers of polyvinyl chloride and polyvinyl acetate, copolymers of styrene, butadiene, and/or butadiene-acrylonitrile or polybutadiene.

The claimed compositions can also contain a variety of well-known and conventionally utilized additives, including fillers such as carbon black and bentonite clay, plasticizers, adhesion promoters, stabilizers for the vinyl chloride polymer and antioxidants for the other polymer components. The compositions are generally prepared by simply combining the various ingredients with agitation.

The claimed compositions are particularly suitable for use as adhesives and sealants, preferably sealants, over prinied metal. They can also be utilized over other substrates including cold rolled steel, ziiicrometal and galvanized metal. The time and temperature for fusion can vary widely depending on the particular copolymer composition and plasticizer. The compositions are usually fused by baking at a temperature of from about 120° C. to about 180° C., preferably from about 120° C. to about 160° C. The time required for fusion of the composition usually ranges from about 20 minutes to about 120 minutes, preferably from about 30 minutes to about 60 minutes.

The claimed compositions are particularly advantageous in that they have excellent adhesion to primed metal substrates and in addition can be topcoated with a variety of coating compositions without yellowing of the topcoat. The claimed compositions also exhibit good tensile strength and elongation, good reverse impact resistance at low temperatures, e.g., −20° C. and very good adhesion after condensing humidity exposure.

The following examples are illustrative of the invention and are not intended to be limiting.

EXAMPLE 1

The following liquids were mixed together: 7.9 g PLASTHALL DOZ (dioctyl azelate from CP Hall), 1.1 g SYNPRON 431 (organophosphite stabilizer from Synthetic Products Co.), 24.4 g diisodecyl phthalate (DIDP). The following solids were added to the mix under agitation: 15.9 g VESTOLITE E-7012 (polyvinyl chloride homopolymer from Huls), 5.6 g OXY 567 (polyvinyl chloride homopolymer from Occidental), 2.8 g OXY 6338 (copolymer of 95 wt. % polyvinyl chloride and 5% polyvinyl acetate from Occidental), 16.9 g SNOWFLAKE (calcium carbonate from Thompson-Weinman), 19.8 g MULTIFLEX SC (stearic acid coated calcium carbonate from Pfizer) and 1.7 g calcium oxide. This system was the control with no adhesion promoter and no yellowing preventative. To test for yellowing resistance, a wedge of sealant was drawn down over a 4″×12″×.030″ (10.16 cm×30.48 cm×0.08 cm) metal panel coated with ED3150 UNI-PRIME electrocoat primer commercially available from PPG Industries, Inc. The pruner had previously been fully cured at 350° F.(177° C.)/30 minutes. The wedge had the following dimensions:

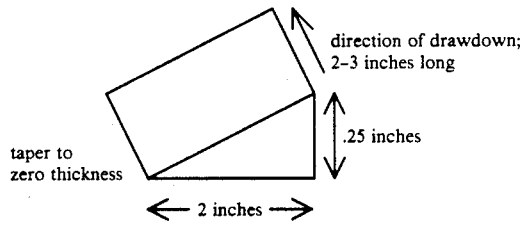

The sealant was then baked 30 minutes at 325° F.(163° C.). After cooling, the sealant and panel were top-coated, first with 1.5 mils (wet) of white basecoat, UBC 8554 available from PPG Industries, Inc. followed, after a 2 minute flash time at room temperature, by 1.5 mils (wet) of clearcoat, URC 1000, also from PPG Industries, Inc. The painted panel was then baked 30 minutes at 250° F.(121° C.). To test for adhesion, a knife blade was inserted under both thin and thick portions of the fully painted and baked sealant. To pass, failure needed to be cohesive. The sealant could not pull cleanly off the primer at either thick or thin edges of the drawdown. Results are shown in Table 1. To test for resistance to topcoat yellowing, the fully painted and baked sealant-plus-panel was placed in condensing, e.g. 100 percent humidity cabinet at 130° F.(54° C.) for 1 week. Upon removal, the panel was dried and visually inspected for color difference between topcoat over the sealant and topcoat over the electrocoat primer. The visual color difference was rated between 10 (greatest difference) and 0 (no difference). To pass the test, color difference needed to be less than 2. Results are also shown in Table 1. A second method for determining color difference involved photomertic measurement with a Macbeth Color Eye 2020 Plus with a computer screen (Tandem 6AT/40, 6 HC) and appropriate software ("Color 2" from Davidson Colleagues, Tatamy, PA 18085). The color difference was designated "ΔY" and defined as follows:

$$\Delta Y = \frac{[\text{Yellowness Index value}}{\text{of topcoated sealant}]} - \frac{[\text{Yellowness Index value of same}}{\text{topcoated panel without sealant}]}$$

Six readings per sample were taken and averaged for the ΔY value. A detailed description of the yellowness index can be found in ASTM method 6131, Sep. 1, 1965. ΔY values are also shown in Table 1. To pass the test ΔY needed to be less than 5. With no adhesion promoter and no yellowing preventative, Example 1 showed no adhesion and severe yellowing.

EXAMPLE 2

The ingredients for this example are listed in Table 1. The procedure for mixing was the same as for Example 1. This example shows the effect of adding a commonly used adhesion promoter, such as EURETEK 580, a polyaminoamide from Sherex Corporation. Adhesion was acceptable, but topcoat yellowing resistance was poor.

EXAMPLE 3

The ingredients for this example are listed in Table 1. The procedure for mixing was the same as for Example 1. Copolymer A was a 12.5% solution of VMCA (copolymer of 81% vinyl chloride, 17% vinyl acetate and 2% maleic acid from Union Carbide) in diisodecylphthalate (DIDP) and demonstrates the effect of an acid-modified polyvinyl chloride/polyvinyl acetate used in place of polyaminoamide as an adhesion promoter. Adhesion was acceptable. Topcoat yellowing resistance was improved, but still only fair. The solution was made by blending VMCA with DIDP on an air-mixer for one hour at 300° F.

EXAMPLE 4

The ingredients for this example are listed in Table 1. The procedure for mixing was the same as for Example 1. Copolymer B was a 12.5% solution of VROH (copolymer of 93.1% vinyl chloride, 4.6% vinyl acetate and 2.3% vinyl alcohol from Union Carbide) in DIDP made by blending VROH with DIDP on an air-mixer for one hour at 300° F. The example demonstrates the effect of a hydroxyl-modified polyvinyl chloride/ polyvinyl acetate used in place of polyaminoamide as an adhesion promoter. Adhesion was acceptable. Topcoat yellowing resistance was improved, but still only fair.

EXAMPLE 5

The ingredients for this example are listed in Table 1. The procedure for mixing was the same as for Example 1. Copolymer C was the reaction product of 1-decene and citraconic anhydride prepared as described below. The example demonstrates the effect of an alpha-olefin-/unsaturated anhydride copolymer on topcoat yellowing resistance, which has improved to excellent. Note that in this formula, no adhesion to electrocoat primer was observed.

Reaction of 1-Decene and Citraconic Anhydride

To a 5 liter round bottom flask fitted with a stirrer, thermometer, condenser, and two additional funnels was charged 2520 g (18 moles) of 1-decene. The 1-decene was agitated under a N₂ blanket and heated to 120° C. To the heated 1-decene was added in separate streams an initiator solution of t-butylperbenzoate (78.4 g) in 280 g of 1-decene and a charge of 224 g (2 moles) of citraconic anhydride. The initiator feed was started 15 minutes before the citraconic anhydride feed and extended over 2 hours. The citraconic anhydride was added over 1 ½ hours. After both feeds were completed the entire solution was heated at 120° C. for 1 hour after which it was heated to 180° C. and solvent removed. At 180° C. the solution was sparged with N₂ for 1 hour then poured into a container. The resulting polymer had a Z7(−) Gardner Holt Viscosity, a color of 2 and a weight per gallon of 8.15, the solids at the end of a bake of 110° C. for 1 hour were 98%.

EXAMPLE 6

The ingredients for this example are listed in Table 1. The procedure for mixing was the same as for Example 1. This example demonstrates the improvement in electrocoat primer adhesion with the addition of Copolymer A (see Example 3) to Example 5. Note that topcoat yellowing resistance was still excellent.

EXAMPLE 7

The ingredients for this example are listed in Table 1. The procedure for mixing was the same as for Example 1. Copolymer D was a 25% solution in DIDP of the reaction product of 1-octene and maleic anhydride prepared as described below. The polymer was used in combination with Copolymer A (see Example 3) and demonstrates another alpha-olefin/unsaturated anhydride combination giving excellent topcoat yellowing resistance.

Reaction of 1-Octene and Maleic Anhydride

To a 12 liter round bottom flask fitted with a stirrer, condenser, thermometer, and two dropping funnels was added 3024 g (27 moles) of 1-octene. The 1-octene was agitated under N₂ and heated to reflux. To the refluxing 1-octene was added in separate streams an initiator 18.23 g of t-amyl peracetate 60% in odorless mineral spirits (LUPERSOL 555-M60 from Penwalt Corporation) dissolved in 750 ml of butyl acetate. The initiator solution was added over 3 hours total and it was started ½ hour before adding a solution of 1323 g (13.5 moles) of maleic anhydride dissolved in butyl acetate over two hours. When the additions were complete the solution was refluxed for 1 hour then it was heated to 180° C. and distillate was removed. On reaching 180° C. the solution was N₂ sparged for ½ hour and then poured into a pan. The solid polymer was 97% solids at the end of a 110° bake for 1 hour.

EXAMPLE 8

The ingredients for this example are listed in Table 1. The procedure for mixing is the same as for Example 1. Copolymer E was a 25% solution in DIDP of the reaction product of 1-decene and maleic anhydride prepared as described below. Copolymer F was an 11.4% solution of CHEMIGUM P-83 (copolymer of 33% acrylonitrile, 63% butadiene and 4% divinylbenzene) in DIDP, added to improve sealant elongation. This example demonstrates the use of an alpha-olefin/unsaturated anhydride copolymer as both adhesion promoter and topcoat yellowing preventative. Adhesion is acceptable. Yellowing resistance is excellent.

Reaction of 1-Decene and Maleic Anhydride

To a 5 liter round bottom flask fitted with a stirrer, thermometer, condenser (continual take off type), and 2 addition funnels was added 1403.5 g (10 moles) of 1-decene. The 1-decene was agitated and heated to 145° C. To this was added both an initiator, 33.8 g of t-amyl peracetate 60% active in mineral spirits (LUPERSOL 555-M60 from Pennwalt Corporation) in 278.5 g of butyl acetate and 491.2 g of maleic anhydride (5 moles) dissolved in 1228 g of butyl acetate. The initiator was started ¼ hour before the anhydride solution and the initiator solution was added over 3 hours while the maleic anhydride solution was added over 2 hours. After the additions were complete the solution was held at 145° C. for 1 hour then heated to 180° C. and distillate removed the resulting material was $N_2$ sparged for 1 hour at 180° C. and then poured into a pan. The crystaline polymer was 98.4% solids as determined by heating a sample at 110° C. for 1 hour.

EXAMPLE 9

The ingredients for this example are listed in Table 1. The procedure for mixing is the same as for Example 1. Ricon 131/MA-17 was a copolymer of 83% butadiene and 17% maleic anhydride from Colorado Specialty Chemicals. This example demonstrates the use of another unsaturated aliphatic monomer/unsaturated anhydride combination giving acceptable adhesion and excellent topcoat yellowing resistance.

What is claimed is:

1. A process for coating a substrate having an electrodeposited coating composition, comprising,
   (a) applying to said electrodeposited coating composition a plastisol based composition, comprising a polyvinyl chloride plastisol and between about 0.5 and about 20 weight percent based on total weight of the plastisol based composition of a copolymer of a cyclic-aliphatic olefinically unsaturated monomer material or an aliphatic olefinically unsaturated monomer material selected from the group consisting of alpha-olefins and dienes and an anhydride containing monomer material capable of vinyl addition polymerization; and
   (b) applying a topcoat over said plastisol based composition.

2. The process of claim 1 wherein the olefinically unsaturated material is selected from linear aliphatic and cyclic-aliphatic olefinically unsaturated material.

3. The process of claim 1 wherein the olefinically unsaturated material is a linear aliphatic material.

4. The process of claim 3 wherein the linear aliphatic material is a normal alpha-olefin.

5. The process of claim 4 wherein the normal alpha-olefin is 1-decene.

6. The process of claim 4 wherein the normal alpha-olefin is 1-octene.

7. The process of claim 1 wherein the anhydride containing material is maleic anhydride.

8. The process of claim 1 wherein the polyvinyl chloride is a mixture of functional polyvinyl chloride in which the functional groups are selected from hydroxyl, carboxyl or anhydride and non-functional polyvinyl chloride.

TABLE 1

| | Examples 1-9 plus test results | | | | | | | | |
|---|---|---|---|---|---|---|---|---|---|
| | 1 | 2 | 3 | 4 | 5 | 6 | 7 | 8 | 9 |
| Liquids | | | | | | | | | |
| PLASTHALL DOZ | 7.9 | 7.9 | 7.9 | 7.9 | 7.9 | 7.9 | 7.9 | . | . |
| DIDP | 24.4 | 24.4 | 11.2 | 11.2 | 24.4 | 11.2 | 6.5 | 25.6 | 39.7 |
| Copolymer C | . | . | . | . | 1.9 | 1.9 | . | . | . |
| Copolymer E | . | . | . | . | . | . | . | 7.4 | . |
| Copolymer D | . | . | . | . | . | . | 7.5 | . | . |
| SYNPRON 431 | 1.1 | 1.1 | 1.1 | 1.1 | 1.1 | 1.1 | 1.1 | 1.2 | 1.1 |
| EURETEK 580 | . | .4 | . | . | . | . | . | . | . |
| Copolymer A | . | . | 15.1 | . | . | 15.1 | 15.1 | . | . |
| Copolymer B | . | . | . | 15.1 | . | . | . | . | . |
| Copolymer F | . | . | . | . | . | . | . | 19.1 | 9.5 |
| RICON 131/MA-17 | . | . | . | . | . | . | . | . | 3.7 |
| Solids | | | | | | | | | |
| VESTOLITE E-7012 | 15.9 | 15.9 | 15.9 | 15.9 | 15.9 | 15.9 | 15.9 | 15.9 | 15.9 |
| OXY 567 | 5.6 | 5.6 | 5.6 | 5.6 | 5.6 | 5.6 | 5.6 | 5.6 | 5.6 |
| OXY 6338 | 2.8 | 2.8 | 2.8 | 2.8 | 2.8 | 2.8 | 2.8 | 2.8 | 2.8 |
| SNOWFLAKE | 16.9 | 16.9 | 16.9 | 16.9 | 16.9 | 16.9 | 16.9 | 20.6 | 20.6 |
| MULTIFLEX SC | 19.8 | 19.8 | 19.8 | 19.8 | 19.8 | 19.8 | 19.8 | 17.5 | 24.1 |
| Calcium Oxide | 1.7 | 1.7 | 1.7 | 1.7 | 1.7 | 1.7 | 1.7 | 8.3 | 8.2 |
| CABOSIL TS-720 | . | . | . | . | . | . | . | .7 | 1.1 |
| Adhesion | FAIL | | PASS | | FAIL | | PASS | | |
| Yellowing Resistance | | | | | | | | | |
| Visual | 4 | 6 | 3 | 3 | 0 | 0 | 0 | 0 | 1 |
| ΔY | 9.2 | 10.1 | 5.1 | Not Run | 1.3 | 1.2 | 2.3 | Note Run | |

* * * * *